US 6,446,077 B2
United States Patent
Straube et al.
(10) Patent No.: US 6,446,077 B2
(45) Date of Patent: Sep. 3, 2002

(54) INHERITED INFORMATION PROPAGATOR FOR OBJECTS

(75) Inventors: Dave Straube; Tim Williams, both of Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/157,728

(22) Filed: Sep. 21, 1998

(51) Int. Cl.$^7$ ............................................... G06F 17/00
(52) U.S. Cl. ........................ 707/103; 707/100; 707/102
(58) Field of Search ................................ 707/102, 103, 707/8, 100, 201; 709/226; 714/7; 717/4, 7; 395/707; 345/329

(56) References Cited

U.S. PATENT DOCUMENTS

| | | | | |
|---|---|---|---|---|
| 5,313,630 A | * | 5/1994 | Namioka et al. | 707/103 |
| 5,561,803 A | * | 10/1996 | Kilis | 395/707 |
| 5,652,884 A | * | 7/1997 | Palevich | 713/1 |
| 5,870,742 A | * | 2/1999 | Chang et al. | 707/8 |
| 5,907,844 A | * | 5/1999 | Guay et al. | 707/100 |
| 5,913,037 A | * | 6/1999 | Spofford et al. | 709/226 |
| 6,002,867 A | * | 12/1999 | Jazdzewski | 395/701 |
| 6,049,805 A | * | 4/2000 | Drucker et al. | 707/102 |
| 6,049,807 A | * | 4/2000 | Carroll et al. | 707/201 |
| 6,058,396 A | * | 5/2000 | Birze et al. | 707/103 |
| 6,083,281 A | * | 7/2000 | Diec et al. | 717/4 |
| 6,085,198 A | * | 7/2000 | Skinner et al. | 707/103 |
| 6,092,079 A | * | 7/2000 | Gerard et al. | 707/103 |
| 6,166,732 A | * | 12/2000 | Mitchell et al. | 345/329 |

OTHER PUBLICATIONS

Finke et al., "Distribution and Inheritance in the HERON Approach to Heterogeneous Computing", IEEE, 1993, pp. 399–408.*

Chen et al., "A Reflective Object–Oriented Distributed System for Heterogeneous Multimedia Environments", IEEE, 1995, pp. 186–193.*

Braham, "Integrating of Inherit and Reference Links in the Building of an Object Distributed Database Management System", IEEE, 1997, pp. 535–541.*

* cited by examiner

*Primary Examiner*—Paul R. Lintz
*Assistant Examiner*—Thuy Pardo
(74) *Attorney, Agent, or Firm*—Lee & Hayes, PLLC (57) ABSTRACT

Dynamic inheritance for data in a replicated tree structured database which is dynamically inherited from parent objects is provided by only replicating original modifications, and then causing each system to propagate inherited information across it's local tree of objects. When a change to a security descriptor or a reparenting of objects is received, a breadth first tree traversal is used to find all the affected objects. An ID list is incrementally deleted as each object is updated. A security descriptor propagator queue is used to track the progress of updates, and items are taken off the list only after they are committed to the database. A gate is used to ensure that that transactions which add new objects and the security descriptor propagation transactions which write new security descriptors are mutually exclusive. A new data structure for the propagation queue comprises a table having a unique, incrementing number representing an order, an identifier of the node to begin on, a flag indicting whether the item may be trimmed a client id, an order index used to find the next element in the queue and a trim index which tracks all trimmable nodes.

38 Claims, 3 Drawing Sheets

FIG. 5 though they are in different directories. These functions cannot be run in parallel due to various system constraints, so there is a need to efficiently execute them.
INHERITED INFORMATION PROPAGATOR FOR OBJECTS

FIELD OF THE INVENTION

This invention relates generally to the field of information processing, and in particular to the efficient propagation of updated inherited information for objects.

COPYRIGHT NOTICE/PERMISSION

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in the drawing hereto: Copyright®1998, Microsoft Corporation, All Rights Reserved.

BACKGROUND

Computer operating systems need a way to keep track of information which is stored in or describes objects. A directory service is a program that performs that function. It keeps a database of information relating to each object which is stored in a domain. The domain can be thought of as all the storage space available for objects on one computer or multiple networked computers. When the domain comprises multiple computers, there may be copies of the directory service database on each of the computers. When an object is changed, and the information in the database needs to change to reflect that change in the object, a replicator function is used to initiate the change in the object's database information. The replicator also sends a message to other computers in the network to make the same change to the directory database.

In WindowsNT®, the directory database contains information which is intrinsic, or actually within an object as well as information which is inherited from other objects, referred to as parent objects. The actual inherited information is duplicated in the database. It may be passed on to children of the objects and grandchildren, and so on. When a change to information, which may be inherited, is made, one way to update the information would be to replicate the change in each object to which it applied by sending messages to other systems on an object by object basis. For large object hierarchies, a change in a high level object may cause many such messages to be sent as the change propagates down to lower level objects. This may result in a large amount of network traffic, which could degrade the overall system performance.

There is a need to efficiently and reliably change directory information without generating a large amount of network traffic. There is a need to ensure that such changes are made correctly even when other objects are attempted to be modified during the changes.

SUMMARY OF THE INVENTION

Inherited information changes are propagated in a directory associated with objects independent of replication of such changes to other copies of the directory. By propagating such changes in each directory without generating a replication message for each object so changed, network traffic is greatly reduced.

The inherited information comprises security descriptors in one instance of the invention. The security descriptors are represented in a directory database and comprise permissions for accessing and modifying objects. The inherited information comprises parent lists that identify parents of each object in another instance of this invention. Each object in a hierarchy of objects is represented by a row in the database. Alternatively, a text file with one line per object, or files in a file system are used to represent objects. When a security descriptor is modified by a user, the directory service makes the change and a replicator sends a message to other copies of the directory database, which in one embodiment is represented in tree structure. Also, the directory service sends an event notification to a security descriptor propagator. The propagator traverses the directory tree in a breadth first manner, and modifies the security descriptors of all related objects. While breadth first provides some efficiencies, other traversal methods, such as depth first may also be used. Only when all the changes are committed, will the propagator complete the updating operation.

A gate is used to control some types of access to the directory so that only one type of operation may proceed at any given time. A thread must enter the gate before starting a database transaction that will add a new object, and before entering a transaction that modifies inherited information on behalf of the propagator. Threads leave the gate after closing the database transaction. The gate ensures accuracy of the database in a dynamic changing environment.

The propagation of changes is moved into the core of the directory service, relieving calling applications from having to replicate changes themselves, and avoiding large amounts of network traffic which would result from such replication.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into multiple sections. In the first section, the hardware and the operating environment in conjunction with which embodiments of the invention may be practiced are described. In the second section, a directory, and services that modify and maintain the directory by propagation of changes within the directory are shown and described. Next, a gate is described which controls which threads may operate on the directory at any given time, followed by a conclusion which summarizes the invention and points out some of the potential benefits and describes further alternative embodiments.

Hardware and Operating Environment

Figure 1:
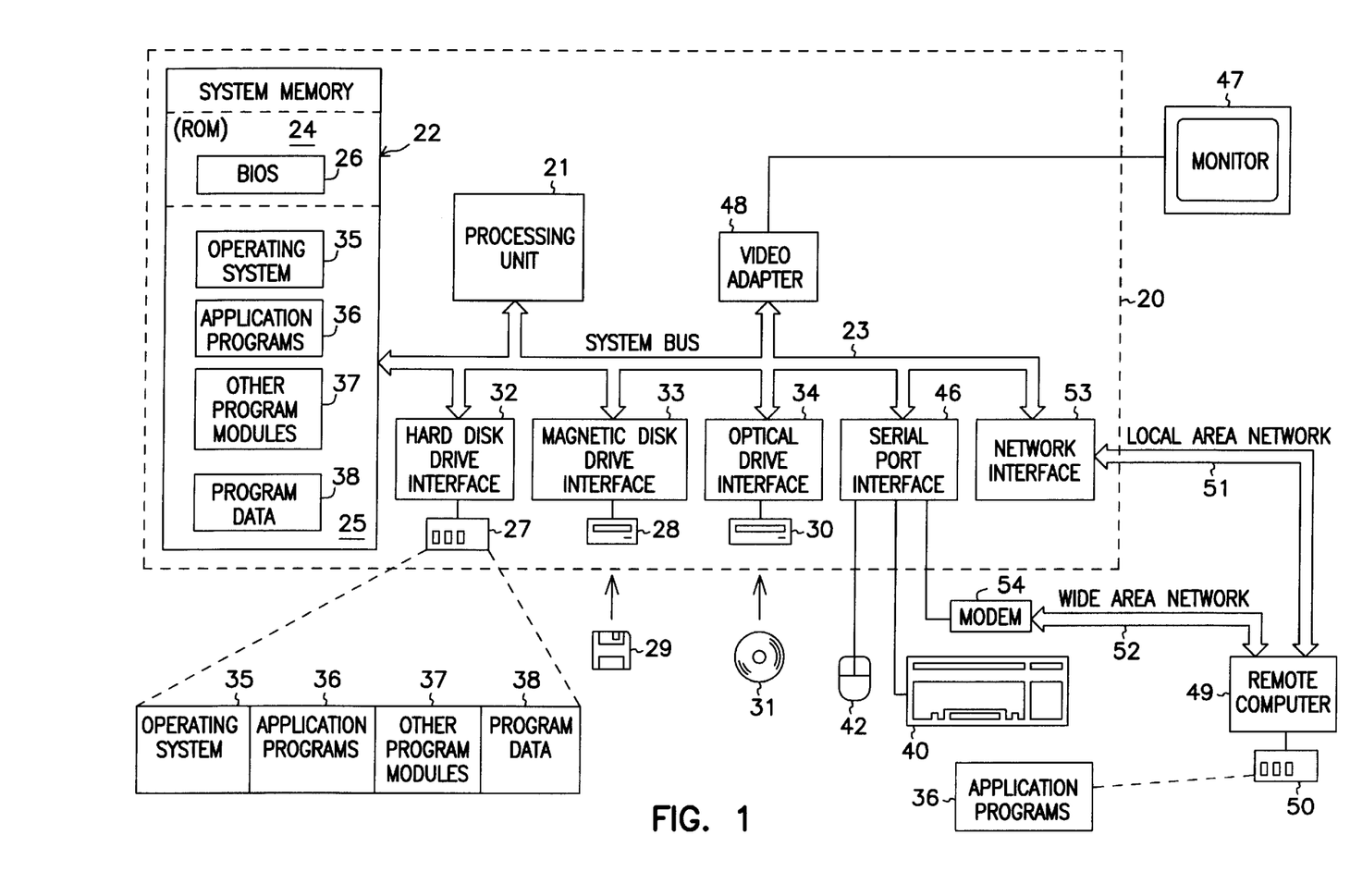
FIG. 1 is a block diagram of a hardware and operating environment of the present invention.

FIG. 1 provides a brief, general description of a suitable computing environment in which the invention may be implemented. The invention will hereinafter be described in the general context of computer-executable program modules containing instructions executed by a personal computer (PC). Program modules include routines, programs, objects, components, data structures, etc. that perform particular tasks or implement particular abstract data types. Those skilled in the art will appreciate that the invention may be practiced with other computer-system configurations, including hand-held devices, multiprocessor systems, microprocessor-based programmable consumer electronics, network PCs, minicomputers, mainframe computers, and the like which have multimedia capabilities. The invention may also be practiced in distributed computing environments where tasks are performed by remote processing devices linked through a communications network. In a distributed computing environment, program modules may be located in both local and remote memory storage devices.

FIG. 1 employs a general-purpose computing device in the form of a conventional personal computer 20, which includes processing unit 21, system memory 22, and system bus 23 that couples the system memory and other system components to processing unit 21. System bus 23 may be any of several types, including a memory bus or memory controller, a peripheral bus, and a local bus, and may use any of a variety of bus structures. System memory 22 includes read-only memory (ROM) 24 and random-access memory (RAM) 25. A basic input/output system (BIOS) 26, stored in ROM 24, contains the basic routines that transfer information between components of personal computer 20. BIOS 24 also contains start-up routines for the system. Personal computer 20 further includes hard disk drive 27 for reading from and writing to a hard disk (not shown), magnetic disk drive 28 for reading from and writing to a removable magnetic disk 29, and optical disk drive 30 for reading from and writing to a removable optical disk 31 such as a CD-ROM or other optical medium. Hard disk drive 27, magnetic disk drive 28, and optical disk drive 30 are connected to system bus 23 by a hard-disk drive interface 32, a magnetic-disk drive interface 33, and an optical-drive interface 34, respectively. The drives and their associated computer-readable media provide nonvolatile storage of computerreadable instructions, data structures, program modules and other data for personal computer 20. Although the exemplary environment described herein employs a hard disk, a removable magnetic disk 29 and a removable optical disk 31, those skilled in the art will appreciate that other types of computer-readable media which can store data accessible by a computer may also be used in the exemplary operating environment. Such media may include magnetic cassettes, flash-memory cards, digital versatile disks, Bernoulli cartridges, RAMs, ROMs, and the like.

Program modules may be stored on the hard disk, magnetic disk 29, optical disk 31, ROM 24 and RAM 25. Program modules may include operating system 35, one or more application programs 36, other program modules 37, and program data 38. A user may enter commands and information into personal computer 20 through input devices such as a keyboard 40 and a pointing device 42. Other input devices (not shown) may include a microphone, joystick, game pad, satellite dish, scanner, or the like. These and other input devices are often connected to the processing unit 21 through a serial-port interface 46 coupled to system bus 23; but they may be connected through other interfaces not shown in FIG. 1, such as a parallel port, a game port, or a universal serial bus (USB). A monitor 47 or other display device also connects to system bus 23 via an interface such as a video adapter 48. A video camera or other video source is represented at 60 as being coupled to video adapter 48 for providing video images for video conferencing and other applications, which may be processed and further transmitted by personal computer 20. In further embodiments, a separate video card may be provided for accepting signals from multiple devices 60, including satellite broadcast encoded images. In addition to the monitor, personal computers typically include other peripheral output devices (not shown) such as speakers and printers.

Personal computer 20 may operate in a networked environment using logical connections to one or more remote computers such as remote computer 49. Remote computer 49 may be another personal computer, a server, a router, a network PC, a peer device, or other common network node. It typically includes many or all of the components described above in connection with personal computer 20; however, only a storage device 50 is illustrated in FIG. 1. The logical connections depicted in FIG. 1 include local-area network (LAN) 51 and a wide-area network (WAN) 52. Such networking environments are commonplace in offices, enterprise-wide computer networks, intranets and the Internet.

When placed in a LAN networking environment, PC 20 connects to local network 51 through a network interface or adapter 53. When used in a WAN networking environment such as the Internet, PC 20 typically includes modem 54 or other means for establishing communications over network 52. Modem 54 may be internal or external to PC 20, and connects to system bus 23 via serialport interface 46. In a networked environment, program modules, such as those comprising Microsoft® Word which are depicted as residing within 20 or portions thereof may be stored in remote storage device 50. Of course, the network connections shown are illustrative, and other means of establishing a communications link between the computers may be substituted.

Software may be designed using many different methods, including object oriented programming methods. C++ and Java are two examples of common object oriented computer programming languages that provide functionality associated with object oriented programming. Object oriented programming methods provide a means to encapsulate data members (variables) and member functions (methods) that operate on that data into a single entity called a class. Object oriented programming methods also provide a means to create new classes based on existing classes. These new classes may be referred to as children of the classes from which they are created, parent classes, and they may inherit the methods of their parents.

An object is an instance of a class. The data members of an object are attributes that are stored inside the computer memory, and the methods are executable computer code that act upon this data, along with potentially providing other services. The notion of an object is exploited in the present invention in that certain aspects of the invention are implemented as objects in one embodiment.

An interface is a group of related functions that are organized into a named unit. Each interface may be uniquely identified by some identifier. Interfaces have no instantiation, that is, an interface is a definition only without the executable code needed to implement the methods which are specified by the interface. An object may support an interface by providing executable code for the methods specified by the interface. The executable code supplied by the object must comply with the definitions specified by the interface. The object may also provide additional methods. Those skilled in the art will recognize that interfaces are not limited to use in or by an object oriented programming environment.

Figure 2:
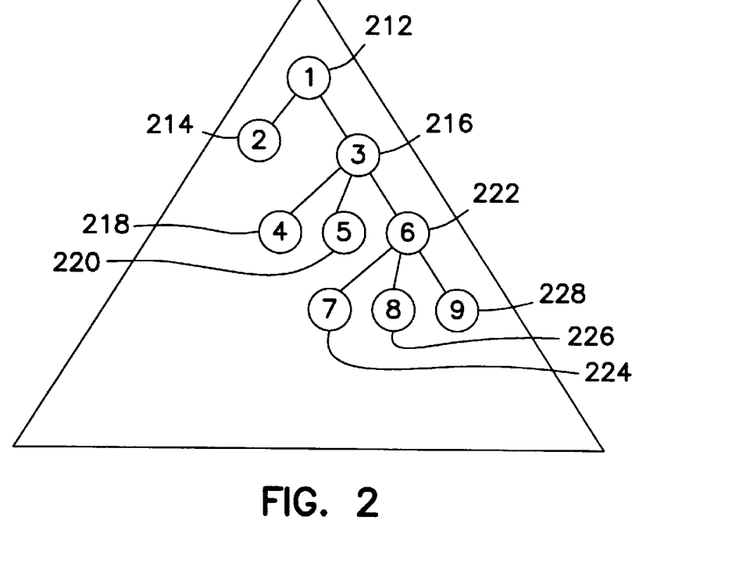
FIG. 2 is a block diagram of a database object directory tree structure.

In FIG. 2, a block representation of a replicated tree structured database is shown generally at 210. A directory tree is a visual representation of the relationships between multiple objects on a storage domain. The storage domain represents storage on a single computer system, or multiple computer systems having some form of shared storage. While a tree is described, other structures may also be used as the relationships between objects can take many different forms, such as an arbitrary acyclic graph. Tree 210 has representations of nine objects which are abstract collections of data. A top level object 212 is represented by a "1" in a circle. The other eight objects are similarly represented by corresponding integers. A second object 214 is a child of the first object, as is a third object 216. The third object 216 has three children, 218, 220 and 222. Object 222 also has three child objects 224, 226, and 228. As an example, there may be an object representing a user. That object would have associated data including (but not limited to): Given Name, Surname, Middle Name, Title, Phone Number, Password, Salary, Office Location, Home Address, and Shoe Size. The objects stored in a directory follow a class hierarchy. Thus, an object of type User may have the data Given Name, but an object of type Computer does not. Further, an object of type Special User, where Special User is a subclass of User, inherits the ability to store the data Given Name, and also has the new ability to store the data Special Data. Inherited data also includes information describing who can access the object, and what level of access permission they are given. Such permissions include the ability to only read the object, or to both read and write or modify the object among many other possible permissions.

Figure 3:
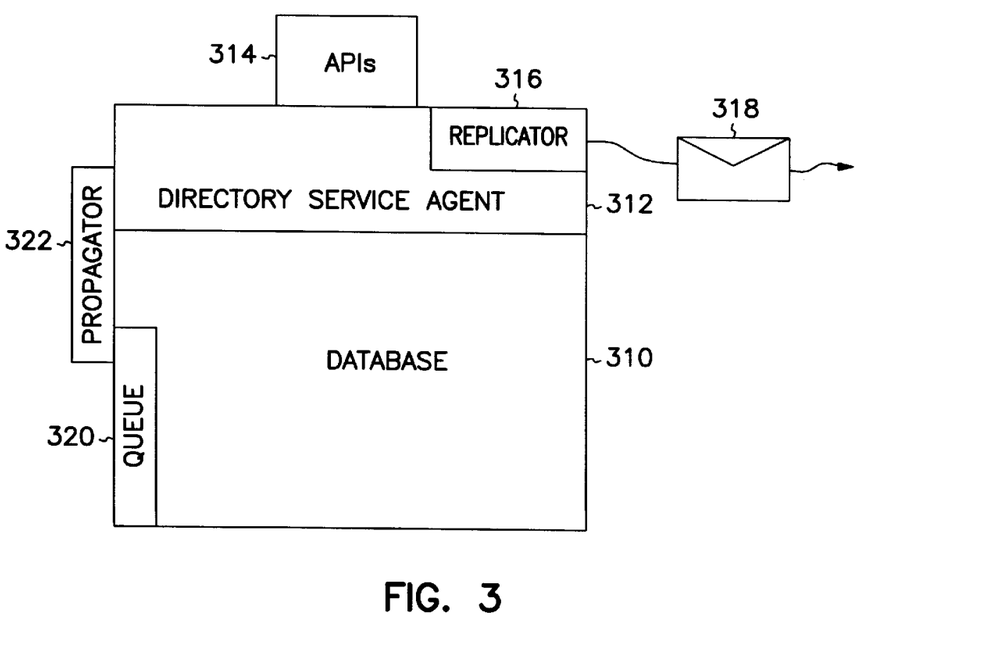
FIG. 3 is a block diagram showing functions which allow modification and updating of the directory tree of FIG. 2.
Figure 4:
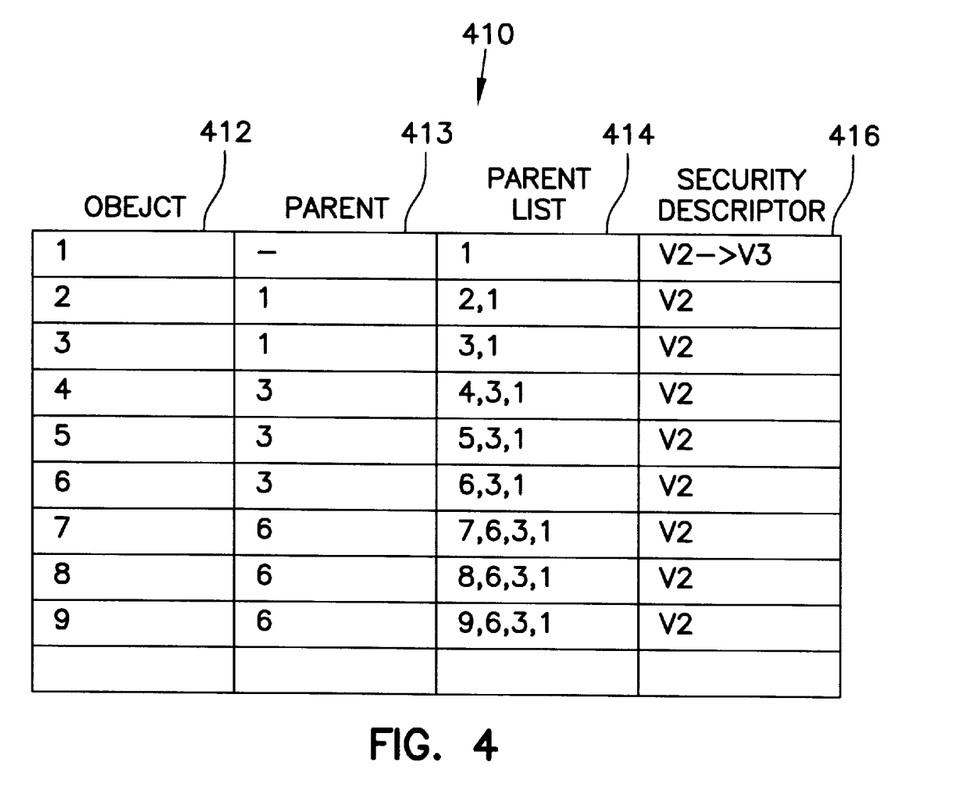
FIG. 4 is a table showing a portion of the directory tree relating to parent lists.

The permissions, and other inherited information such as parent lists and other information relating and identifying objects are actually stored in a transactioned database 310 as seen in FIG. 3, and a portion of which is shown at 410 in FIG. 4. Other storage mechanisms, such as a text file with one line per object, or files in a file system are used to represent objects are used in alternative embodiments. Database 310 contains a row of information for each object which describes the inherited characteristics of the object as well as other maintenance information about the object such as ownership and an identifier. A directory service agent 312 interfaces to the database and performs operations on the data, including allowing modifications and updates as well as performing searches on the data in the database 310. A set of application programming interfaces (APIs) 314 provide an interface into the services provided by the directory service agent 312 to allow users, both human and other programs, to generate requests to use the data in the database 310. One common request is to modify the permissions to access an object as represented by an access control list stored as a security descriptor in the database. Such requests and the manner in which changes to a security descriptor is performed is well known in the art. One common example would be to add a printer object at some point in a network, or to give permission to a new employee or group of users to access the object.

Once such a request to modify the security descriptor, or other inherited information such as a parent list, is performed by the directory service agent 312, a replication of that request is made by a replicator 316 in a known manner. The replication is packaged up into a communication 318 and sent to other systems which have a copy of the database 310 which must also be updated. For information that is intrinsic to the object and not inherited, this process of sending the message or replicating the change to other copies of the database is all that is needed. However, a change to inheritable information in an object may also mean that children of the changed object need to be changed. The directory service agent then writes an indication of which object has been changed (basically a database row number or id) into a propagation queue or list, which is read by a propagator module 322 which is referred to as a daemon that hangs off the side of the directory database. The propagator 322 reads the queue, and then finds all the children affected by the change and modifies their inherited information by reading each affected object and its parent to determine how to change the inherited information. This method of propagating changes as opposed to replicating each change to each object via a message can significantly cut down on network traffic depending on the complexity of the object tree and amount of changes to inherited information which must be dynamically propagated.

Two types of inherited information are reflected in a portion of the database 310 shown at 410 in FIG. 4. A first column 412 contains an object identifier, shown for simplicity as an integer corresponding to the integers in circles representing objects in FIG. 2. Nine rows are shown, each row also having a parent column 413 identifying the parent, a parent list column 414 identifying the full line of parents or heritage of each object, and a security descriptor column 416 showing a simplified representation of a security descriptor. The first object has only itself in its parent list column 414 because it is a top level object. The second and third objects both have the first object as a parent (inherited from their parent's parent list) as well as themselves. The fourth, fifth and sixth objects have both the first and third objects as parents (inherited from their parent's parent list) as well as themselves. The seventh, eighth and ninth objects have the first, third and sixth objects as parents (inherited from their parent's parent list) as well as themselves. The first object has a security descriptor simply referred to as V2 for this embodiment. Each of the other objects in the table ultimately derives from object 1, and inherits its security descriptor.

When a request is issued through an API 314 to change the security descriptor of the first object from V2 to V3, the directory service agent 312 writes the change of the security descriptor from V2 to V3 and verifies that the user requesting the change is authorized to make the change, and that the change is a valid change. The id of the object, "1" in this case is then written to the propagator queue 320, which is a FIFO queue, with some pruning to avoid duplication of effort as will be discussed below. Each change to a dynamically inheritable attribute of an object results in the id of the object changed being written to the queue 320. Once the change is written, and the queue updated by the directory service agent, the change to the security descriptor is committed to the database and written to non-volatile storage such as disk. Next, the propagator 322 is notified via an event such as a win32 event or other form of communication that a change to a dynamically inheritable attribute has been written and put in the queue. While a queue is used in this embodiment, it will be recognized that other forms of notification may be used, such as the use of a direct work request indicating the object that has been changed. Next, the replicator 316 is told of the change, which results in a message being created which is representative of the change to be made. The message is then sent to other systems having copies of the database which must be synchronized with the current copy.

Figure 5:
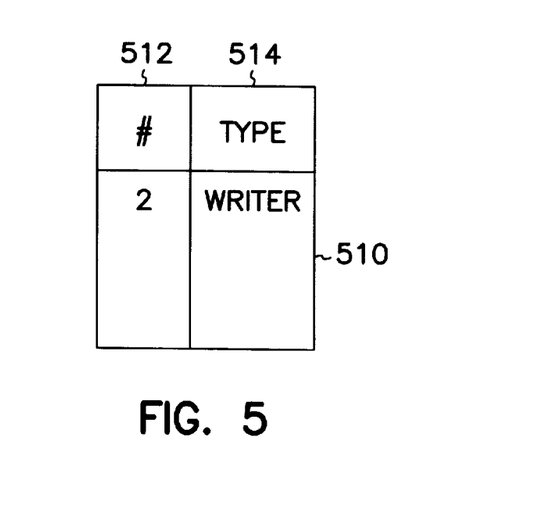
FIG. 5 is a block diagram of a gate used to exclude certain threads from operating on the directory tree while other types of threads are accessing the directory.

At start up time, the queue of propagations to be done is refreshed from saved information. A single propagation thread is started. Note, that in one embodiment, propagations are serialized such that one propagation will complete before the next is done to simplify understanding of propagation interrelations and also to avoid spawning many propagation threads. The thread waits on the propagation queue, and upon receiving the event, propagator 322 in each system having a copy of the database needed changing, wakes up and reads the first entry in the queue 320. It then enters a gate 510 as shown in FIG. 5. Gate 510 is used to ensure that other accesses to the database are not being made that might interfere with, or be incorrectly processed as a result of the modifications to be made. Gates are well known exclusion constructs and this one will not be described in great detail other than to say that threads generated by the propagator to update dynamically inherited information are deemed to be "writers", and all others adding objects "readers". Threads not doing these operations don't need to enter the gate. Only one type of thread ("reader" or "writer") is allowed in the gate at any one time, although many threads of one type may be inside the gate at once. The number of such threads in the gate is indicated at 512, and the type of thread, whether a reader or a writer is indicated at 514. If at least one of either type is in the gate, the other type must wait until all are done and out of the gate before entering.

When the propagation is initiated, the propagator finds the identity of the first object from the queue. Then, the propagator thread enters the gate. It reads the security descriptor from the object and from its parent and calculates the new security descriptor, and then writes it to the object. The write is done in such a manner that it does not trigger a directory replication event. This transaction is then committed, and the propagator thread then leaves the gate. At this point, only the security descriptor for the first object has been changed. However, since the first object may be the parent of many other objects, their security descriptors must also be changed. To do this, the propagator generates a list of children of the first object using a breadth first traversal of the tree. In this case, it will look for "1s" in the database parent column, and identify the second and third objects as children of the first object and add them to the list of children yet to be processed. The propagator does not need to enter the gate to generate this list. The use of the gate by add threads guarantees that every child will either be found by the propagator, or that new children not noticed by the propagator will be added AFTER the data on the parent has been fixed by the propagator and will therefore have correct inherited information. The propagator will then reenter the gate and recalculate the security descriptor of the second object by reading the second object and its parent, the first object. It will write the new security descriptor and exit the gate. It will then look for children of the second object. Finding none if will remove the second object from the list of children and move on to the third object. It makes the change by reentering the gate, reading the third object and its parent to recalculate the security descriptor and then leaving the gate. This time, it does find children of the third object, namely the fourth, fifth and sixth objects and adds them to the list of children. Proceeding with the search and change and addition and removal of objects to the list of children, it finally changes the ninth object, ensures it is stored to disk, and then removes the id of the first object from the queue once the list of children is empty.

Each database on each system is so updated by its own propagator. The queue may have update indications placed on it in at least two ways. The first is as described above, via an API call from a user such as a person or another program. Another way for the change to be queued arises from the receipt of a message such as message 318 indicative of a change to be applied to the database. The directory service agent receives such messages and updates the queue with the id of the object to which the change should be applied. The propagator, as stated above, operates independent of the replicator portion of the directory service agent, and makes changes to all affected objects without the generation of further network traffic.

There are a few optimizations performed by the propagator to enhance performance of the propagation of a change or changes to the database. The first involves comparing the previous security descriptor of a child with the new calculated security descriptor. If there is no change, there is no need to find the children of such child; since the data was already correct on the child object, then the objects which inherit from this child object will also have correct data. Eliminating the search and attempted updates can save significant time. If this is the first traversal after a power up, and the propagation queue was not empty after power up, the propagator must continue to identify children and add them to the list, even if no changes are detected. This is because a propagation is being restarted that was probably interrupted by a power cycle. The top of the tree may have already been done, but the bottom of the tree may not have been done. If the traversal is stopped too early, the change would not be properly propagated to the lowest level children. Similarly, the security descriptor of direct children of the start object is always verified. This is because the security descriptor of the start object has already been modified by the directory service or the replicator, and so the newly calculated security descriptor would not be different unless there had been a rename or reparent operation, or if another propagation had been queued for the start object's parent.

Another optimization is the use of the breadth first traversal. Any tree traversal could be used, but if a breadth first traversal is used, then all children of an object are processed as a group. Thus the parent object need be read only once, and its security descriptor may be held in memory while its children are processed, at which time it is no longer needed. Then, the security descriptor of the parent of the next group of peers is read.

The propagation of changes has been described with respect to a tree directory structure. It shoud be noted that other representations of the relationships between objects such as arbitrary acyclic graphs may also have changes which need to be propagated. In some embodiments, the propagation may involve propagating changes where they need to go, depending on the relationships between the objects rather than a propagation down a tree structure.

A further example of changes to dynamically inherited information comprises a move or reparenting operation. Parent lists will then need to be modified to properly reflect heritage, and also security descriptors may need to be modified if a new parent has different security permissions. In FIG. 2, if the sixth object 222 were to be reparented through the use of an API 314 so that its parent became the fifth object, the parenting information 414 would no longer be correct. Instead of "6,3,1", it should be "6,5,3,1". Further, the seventh, eighth and ninth objects would also have changed parent lists. The same process is followed to propagate the change by queueing the id of the object that changed in the propagator queue 320. The propagator again performs the traversal of the directory tree, changing parent lists as it goes.

A table is used to implement the queue 320 in one embodiment. A unique incrementing number is used in one column to enable the table to function as a queue. As stated above, the queue also holds the id of the node or object on which to start the propagation. A flag is used to describe whether the item in the queue may be trimmed from the queue if another propagation subsumes it. The Null value is used if the item may not be trimmed, otherwise it is non-null. In general, if the directory service agent causes the propagation itself, it is marked as trimmable. If it is caused by an action taken on behalf of a client, then it is not marked as trimmable. A client id is also associated with a client that made the change that caused the propagation. Two indicies are also used. The first is an order index that is used to find the next element in the queue. A trim index is a compound index over begin-node and the trimmable flag and is used to track all trimmable nodes.

As an optimization, after each node in the tree has been modified, the trim index of the propagation table is read. If the current node is in that index, it is removed from the table, as the propagation is being done, and there are no clients interested in progress information. This allows trimming of most if not all the propagation events caused by an initial replication of large portions of a tree.

The propagation thread keeps track of several items, such as the number of objects touched during the propagation and a unique ID for the propagation. This information may be used to give clients details about the state of the security descriptor propagation underway.

Conclusion

Dynamically inherited information in a database is performed by the use of a propagator which finds related objects and recalculates the appropriate information to update. In a networked system where multiple copies of the database need to be updated, a change to such information in an object is communicated with respect to that one object regardless of the number of objects in each database which will need to be changed as a result of the change. The propagator is described as using a breadth first tree traversal. This type of search works well because the process to update the inherited information needs to read the parent of the child as well as the child. The breadth first tree search ensures that needed data is more likely to be in memory and immediately available to make the update. Other searches may work better on different directory structures. A propagation queue is described as one form of list for keeping track of propagations to perform. A stack may also be used instead of a queue. LIFO methods of adding and removing data from the list would work as well as FIFO. In either case, when the list of pending propagations is completely emptied, the resulting trees hold the same information. This application is intended to cover any adaptations or variations of the present invention. It is manifestly intended that this invention be limited only by the claims and equivalents thereof

We claim:

1. A method of modifying information inherited between objects when one of the objects is modified, the method comprising:

receiving a modification to an object;

writing indications of modified objects into a propagation queue;

searching a directory structure for related objects;

recalculating portions of the related objects which need to be modified as a result of the received modification based on the indications in the queue; and modifying the related objects with the recalculated portions.

2. The method of claim 1 and further comprising creating an id list of the related objects.

3. The method of claim 1 and further comprising creating a list of received modifications.

4. The method of claim 3 wherein the received modifications are received from programs running on a single computer and are received from programs running on networked computers.

5. The method of claim 3 and further comprising trimming the propagation queue to remove modifications that would be redundant.

6. The method of claim 1 wherein the modifications comprise dynamically inherited security descriptors or parent lists.

7. The method of claim 1 wherein searching for related objects is stopped for an object if the portion recalculated did not change.

8. A machine readable medium having instructions stored thereon for causing a computer to perform a method of modifying information inherited between objects when one of the objects is modified, the method comprising:

receiving a modification to an object;

searching a directory database for related objects;

recalculating portions of the related objects which need to be modified as a result of the received modification; and modifying the related objects with the recalculated portions.

9. The machine readable medium of claim 8 and further comprising instructions for creating a queue of received modifications.

10. The method of claim 9 wherein the received modifications are received from programs running on a single computer and are received from programs running on networked computers.

11. The machine readable medium of claim 9 and further comprising instructions for trimming the queue to remove modifications that would be redundant.

12. A machine readable medium having a data structure stored thereon for use in propagating changes to a replicated directory database comprising a plurality of directory objects, the data structure comprising:

an incrementing number data field to enable the data structure to function as a queue;

a start object data field to identify an object of the directory objects with which to begin propagating a change to the object and to a set of corresponding objects comprising information inherited from the object; and an order index data field to identify a next object of the directory objects to continue propagating the change to the next object and to a set of corresponding objects comprising information inherited from the next object.

13. The data structure of claim 12 and further comprising:

a trim flag data field to indicate that an indication of a particular object of the directory objects can be removed from the data structure; and a trim index data field to provide clients with an option to receive information about a state of replication underway.

14. The data structure of claim 13 wherein the trim index comprises a compound index over the trim flag and the start object.

15. In a distributed computing environment at a first computing device, a method for propagating changes across multiple copies of a distributed directory database, the method comprising:

modifying a parent object and one or more related objects in a first copy of the distributed directory database;

responsive to modifying the parent object, communicating a single replication message indicating the parent object to a second computing device in the distributed computing environment; and whereupon receipt of the single replication message causes the second computing device to synchronize a second copy of the distributed database with the first copy such that there is a one-to-one correspondence between modifications made in the first copy and modifications made in the second copy.

16. A method as recited in claim 15, wherein modifying the parent object and the one or more related objects further comprises:

searching the first copy for the one or more related objects; and for each related object:
(a) recalculating a portion of the related object based on a state of the parent and a set of characteristics of the related object; and
(b) modifying the related object based on the portion.

17. A method as recited in claim 16, wherein the distributed directory database comprises a plurality of objects organized as a hierarchal tree, and wherein searching the first copy further comprises searching the first copy for the one or more related objects with a breadth first search starting from the parent object.

18. A method as recited in claim 15, further comprising generating a propagation queue comprising indications of the parent object and the one or more related objects.

19. A method as recited in claim 18, further comprising trimming the propagation queue to remove information that would cause redundant modifications to be made to one or more directory objects in the distributed directory database.

20. A computer-readable medium comprising computer-executable instructions for propagating changes across multiple copies of a distributed directory database, the computer-executable instructions comprising instructions for:

modifying a parent object and one or more related objects in a first copy of the distributed directory database;

responsive to modifying the parent object, communicating a single replication message indicating the parent object to a second computing device in the distributed computing environment; and whereupon receipt of the single replication message causes the second computing device to synchronize a second copy of the distributed database with the first copy such that there is a one-to-one correspondence between modifications made in the first copy and modifications made in the second copy.

21. A computer-readable medium as recited in claim 20, wherein the instructions for modifying the parent object and the one or more related objects further comprise instructions for:

searching the first copy for the one or more related objects; and for each related object:
(a) recalculating a portion of the related object based on a state of the parent and a set of characteristics of the related object; and
(b) modifying the related object based on the portion.

22. A computer-readable medium as recited in claim 20, wherein the distributed directory database comprises a plurality of objects organized as a hierarchal tree, and wherein the instructions for searching the first copy further comprise instructions for searching the first copy for the one or more related objects with a breadth first search starting from the parent object.

23. A computer-readable medium as recited in claim 20, further comprising computer-executable instructions for generating a propagation queue comprising indications of the parent object and the one or more related objects.

24. A computer-readable medium as recited in claim 23, further comprising computer-executable instructions for trimming the propagation queue to remove information that would cause redundant modifications to be made to one or more directory objects in the distributed directory database.

25. A method for propagating multiple changes across various copies of a distributed directory database, the method comprising:

receiving, at a first device, a replication message indicating that a second device has modified a single object in a second copy of the distributed directory database; and responsive to receiving the replication message, synchronizing, at the first device, a first copy of the distributed directory database to mirror the second copy such that at least one change to each of a plurality of objects in the second copy resulting from modification of the single object are replicated in the second copy.

26. A method as recited in claim 25, wherein synchronizing the first copy to mirror the second copy further comprises:

modifying an object in the first copy that corresponds to the single object based on the replication message; and modifying one or more of other directory objects in the first copy that dynamically inherit information the object.

27. A method as recited in claim 25, wherein the second copy comprises a plurality of directory objects that are organized as a hierarchal tree, and wherein synchronizing the first copy to mirror the second copy further comprises:

identifying an object of the directory objects that corresponds to the single object; and locating any other objects of the directory objects that are related to the object using a breadth first search that starts at object.

28. A method as recited in claim 25, wherein synchronizing the first copy to mirror the second copy further comprises:

generating a propagation queue comprising indications of each other object in the first copy that is related to the object; and for each indication in the propagation queue, modifying a corresponding object based on a state of the object and one or more characteristics of the corresponding object.

29. A method as recited in claim 25, wherein synchronizing the first copy to mirror the second copy further comprises:

generating a propagation queue comprising indications of each other object in the first copy that is related to the object; and for each indication:
- (a) determining if one or more portions of a corresponding object need to be changed; and
- (b) only modifying the corresponding object if one or more portions need to be changed.

30. A method as recited in claim 29, further comprising trimming the propagation queue to remove information that would cause redundant modifications to be made to one or more of the directory objects in the first copy.

31. A computer-readable medium comprising computer-executable instructions for propagating multiple changes across various copies of a distributed directory database, the computer-executable instructions comprising instructions for:

receiving, at a first device, a replication message indicating that a second device has modified a single object in a second copy of the distributed directory database; and responsive to receiving the replication message, synchronizing, at the first device, a first copy of the distributed directory database to mirror the second copy such that at least one change to each of a plurality of objects in the second copy resulting from modification of the single object are replicated in the second copy.

32. A computer-readable medium as recited in claim 31, wherein the instructions for synchronizing the first copy to mirror the second copy further comprise instructions for:

modifying an object in the first copy that corresponds to the single object based on the replication message; and modifying one or more of other directory objects in the first copy that dynamically inherit information the object.

33. A computer-readable medium as recited in claim 31, wherein the second copy comprises a plurality of directory objects that are organized as a hierarchal tree, and wherein the instructions for synchronizing the first copy to mirror the second copy further comprise instructions for:

identifying an object of the directory objects that corresponds to the single object; and locating any other objects of the directory objects that are related to the object using a breadth first search that starts at object.

34. A computer-readable medium as recited in claim 31, wherein the instructions for synchronizing the first copy to mirror the second copy further comprise instructions for:

generating a propagation queue comprising indications of each other object in the first copy that is related to the object; and for each indication in the propagation queue, modifying a corresponding object based on a state of the object and one or more characteristics of the corresponding object.

35. A computer-readable medium as recited in claim 31, wherein the instructions for synchronizing the first copy to mirror the second copy further comprise instructions for:

generating a propagation queue comprising indications of each other object in the first copy that is related to the object; and for each indication:
- (a) determining if one or more portions of a corresponding object need to be changed; and
- (b) only modifying the corresponding object if one or more portions need to be changed.

36. A computer-readable medium as recited in claim 35, further comprising instructions for trimming the propagation queue to remove information that would cause redundant modifications to be made to one or more of the directory objects in the first copy.

37. In a distributed computing environment, a method for propagating a plurality of changes across multiple copies of a distributed directory database, the method comprising:

receiving a message indicating that a first object in a distributed directory database has been modified;

responsive to receiving the message:
identifying one or more other objects in the distributed directory database that correspond to the first object; and for each other object in at least one subset of the one or more other objects, changing an attribute of the other object based on a state of the first object and characteristics of the other object.

38. A method as recited by claim 37, wherein the message is a single replication message that is communicated by a first computing device, and wherein the single replication message is received by one or more other computing devices that are operatively coupled to the first computing device.

* * * * *